FIG-4

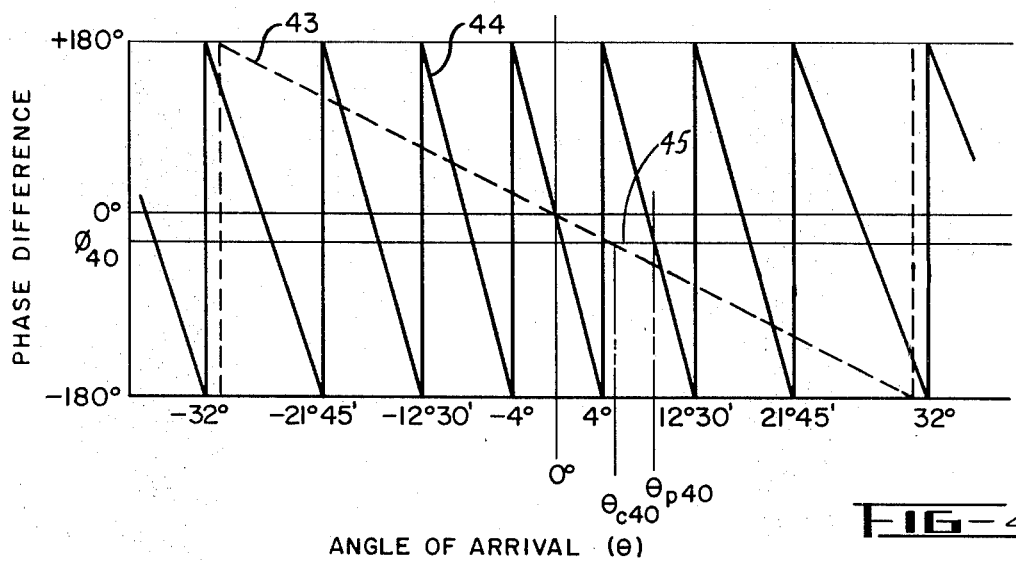

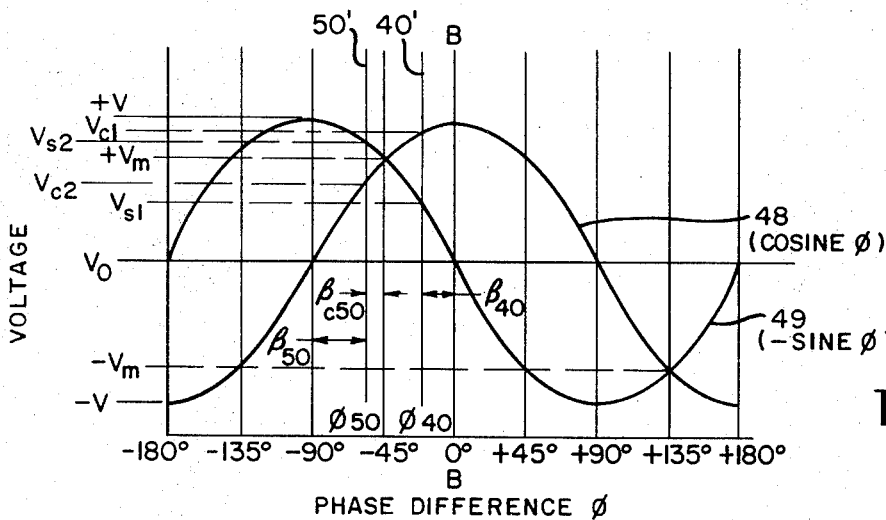

FIG-5

| QUADRANT | 1 | 1 | 2 | 3 | 4 | 5 | 6 | 7 | 8 |
|---|---|---|---|---|---|---|---|---|---|
|  |  | $-Q_2$ | | $-Q_1$ | | $+Q_1$ | | $+Q_2$ | |
| HALF-QUADRANT | 2 | $-D$ | $-C$ | $-B$ | $-A$ | $+A$ | $+B$ | $+C$ | $+D$ |
| COSINE ∅ (48) POLARITY | 3 | $-$ | $-$ | $+$ | $+$ | $+$ | $+$ | $-$ | $-$ |
| $-$SINE ∅ (49) POLARITY | 4 | $+$ | $+$ | $+$ | $+$ | $-$ | $-$ | $-$ | $-$ |
| * SMALLER ABSOLUTE VALUE | 5 | $+$ | $-$ | $-$ | $+$ | $+$ | $-$ | $-$ | $+$ |
| PRESET ANGLE | 6 | 135° | 90° | 45° | 0° | 0° | 45° | 90° | 135° |
| ** COMPLEMENT INDICATOR | 7 | $-$ | $+$ | $-$ | $+$ | $+$ | $-$ | $+$ | $-$ |
| OPERATION | 8 | 135°$+\beta_c$ | 90°$+\beta$ | 45°$+\beta_c$ | 0°$+\beta$ | 0°$+\beta$ | 45°$+\beta_c$ | 90°$+\beta$ | 135°$+\beta_c$ |

\* $/\cos ∅/ > /-\sin ∅/ = +$
$/\cos ∅/ < /-\sin ∅/ = -$
\*\* NC = + , C = $-$
$+ = 1 \quad - = 0$

FIG-10

INVENTORS
JOSEPH J. SPARAGNA
FRED B. BADAL
CHARLES E. THOMPSON

BY *Russell A. Cannor*

AGENT

FIG-11

# United States Patent Office 3,540,053
Patented Nov. 10, 1970

3,540,053
SIGNAL PROCESSOR FOR DETERMINING THE ANGLE OF WHICH TWO ORTHOGONAL SINUSOIDAL SIGNALS ARE A FUNCTION
Joseph J. Sparagna, Saratoga, and Fred B. Badal and Charles E. Thompson, Mountain View, Calif., assignors to Sylvania Electric Products Inc., a corporation of Delaware
Filed May 2, 1968, Ser. No. 726,191
Int. Cl. G01s 3/04
U.S. Cl. 343—113           19 Claims

ABSTRACT OF THE DISCLOSURE

The outputs of the two antennas of a short baseline phase interferometer are heterodyned with a local oscillator signal and limited to provide two constant aplitude IF signals. Each IF signal is applied to the same pair of phase detectors, one of the signals being delayed 90° prior to application to only one of the detectors. The detector outputs are a function of the sine and cosine of the phase difference between the signals received by the antennas, and thus are a function of the direction of arrival of a received signal. This phase difference can vary over ±180° over all possible directions of arrival of an incident signal. These detector outputs are detected and compared to produce a 3-bit word indicating the polarities of the outputs and the output having the smaller absolute value. This 3-bit word indicates the half-quadrant or 45° sector of the phase difference associated with a received signal. The detector output having the smaller absolute magnitude is converted to a 6-bit word defining in the half-quadrant a phase angle associated with the received signal. The 3-bit and 6-bit words are logically combined to produce an 8-bit binary indication of the phase difference between the antenna outputs and thus the direction of arrival of the received signal.

BACKGROUND OF INVENTION

The invention herein described was made in the course of or under a contract or subcontract thereunder, (or grant) with the Department of the Air Force.

This invention relates to a phase interferometer and more particularly to a signal processor for digitally indicating the phase difference between a pair of signals on a monopulse basis.

A dual baseline phase interferometer system measures the relative phase between points of an advancing wavefront for unambiguously determining the direction of arrivals of a received signal defined by the wavefront. Briefly, such a system comprises three antennas spaced apart along a straight baseline and oriented to have maximum response in the same direction to a wavefront parallel to the baseline. The two outside antennas are spaced a number of wavelengths apart and form a long baseline interferometer. The third or middle antenna is located close to (e.g., a half-wavelength from) one of the outside antennas to form a short baseline interferometer. The phase of the antenna outputs is proportional to the sine of the angle of arrivals of the received signal. The antenna outputs of the long baseline and short baseline interferometers are detected in associated phase detectors to produce analog signals proportional to the phase difference between signals received by the associated antennas. The outputs of the short baseline detectors are a course and unambiguous indication of the direction of arrival of the received signal. The outputs of the long baseline detectors, however, are a precise but ambiguous indication of the direction of arrival of the received signal.

In a conventional interferometer system, the detector outputs are applied to drive and control circuits for rotating the antennas and baseline of the interferometer system so that the phase difference between the antenna outputs is zero indicating that the bore sight axis of the interferometer system is aligned with the direction of arrival of the received signal (i.e., the baseline is orthogonal to the direction of arrival). Such a system requires that a continuous wave (CW) signal be present for a period of time in the order of several nanoseconds and requires a number of pulses of a pulse signal in order to accurately align the interferometer bore sight axis with the direction of arrival of the received signal and thus indicate the direction of arrival of the received signal. Also, the output of the phase detectors are analog signals which may not be in convenient form for processing. Analog circuits are also subject to temperature drift.

An object of this invention is the provision of a monopulse phase interferometer.

Another object is the provision of a signal processor for determining the phase difference between a pair of received signals on a monopulse basis.

A further object is the provision of a signal processor for digitally indicating the phase difference between a pair received signals.

SUMMARY OF THE INVENTION

Briefly, a pair of input signals that are proportional to the sine and cosine of a phase difference that can vary over ±180° are logically processed to determine the polarity of the signals and thus the quadrant (a 90° sector) containing a particular phase difference. The absolute values of the signals are compared to produce a binary indication of the signal having the smaller absolute value and thus the half-quadrant (45° sector) containing the particular phase difference. The smaller valued signal is applied to an analog-to-digital converter which produces a digital output indicating the phase angle of the phase difference in the associated half-quadrant. The indications of the polarities and relative magnitudes of the signals are logically combined with the converter output to produce a digital indication of the phase difference between the input signals.

BRIEF DESCRIPTION OF DRAWINGS

FIG. 4 is curves illustrating the operation of the system of FIG. 1, and more particularly is plots of the angle of arrival of a received signal as a function of the phase difference between signals received by the antennas of the system of FIG. 1;

FIG. 5 is graphic representations of the sinusoidal transfer functions of the outputs of phase detectors of the system of FIG. 1;

FIG. 7 is a detailed block diagram of portions of the processor of FIG. 6;

DESCRIPTION OF PREFERRED EMBODIMENT

Figure 1:
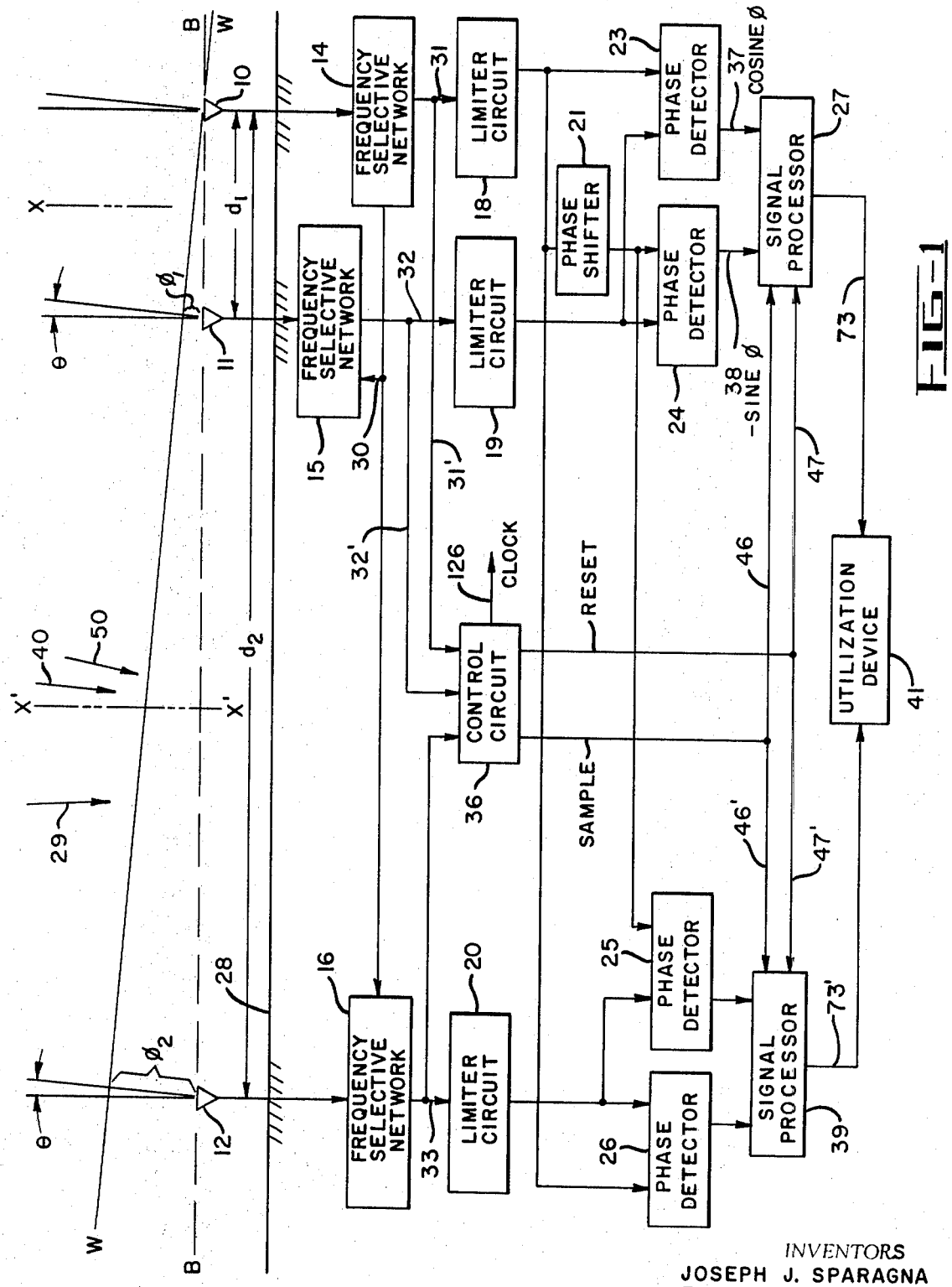
FIG. 1 is a block diagram of a dual baseline phase interferometer system embodying this invention.
Figure 2:
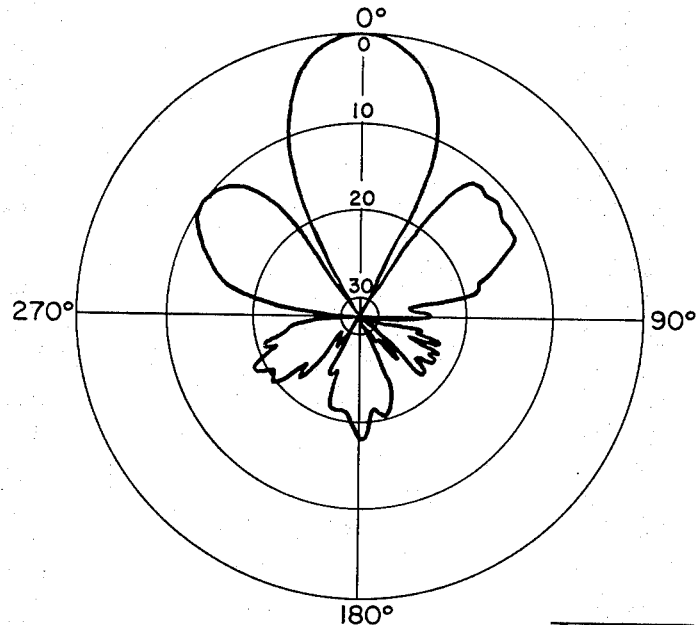
FIGS. 2 and 3 are polar plots of azimuth antenna patterns of the short baseline and long baseline interferometers, respectively, of FIG. 1.

The dual baseline phase interferometer system illustrated in FIG. 1 includes a short baseline and a long baseline phase interferometer. The short baseline interferometer comprises antennas 10 and 11, frequency selective networks 14 and 15, limiter circuits 18 and 19, phase shifter 21, phase detectors 23 and 24 and signal processor 27. Antennas 10 and 11 are directional antennas having substantially identical directional characteristics. The antennas are spaced the same distance above a ground plane 28 and have a straight baseline B—B extending therethrough. The antennas are oriented to have maximum response to a signal 29, for example, which has a direction of arrival parallel to the bore sight axis X—X and perpendicular to the baseline B—B. The antennas are physically spaced apart along line B—B a short distance $d_1$ which may, by way of example, be a half wave-length at the center operating frequency of the system. The azimuth pattern of the array of antennas 10 and 11 is illustrated in FIG. 2.

Frequency selective networks 14 and 15 have matched characteristics which determine the operating frequency band of the system. Network 14, for example, includes a local oscillator (not shown) which produces a local oscillator signal that is applied on line 30 to network 15. The frequency selective networks convert the antenna outputs to intermediate frequency signals which are applied on lines 31 and 32 to limiter circuits 18 and 19, respectively. The outputs of networks 14 and 15 are also applied on lines 31' and 32', respectively, to control circuit 36.

Limiters 18 and 19 are matched devices that convert IF signals from the frequency selective networks to constant amplitude signals. The output of limiter 19 is directly connected to detectors 23 and 24. The output of limiter 18 is directly connected to detector 23, but is connected through phase shifter 21 to detector 24. Phase shifter 21 shifts the phase of the output of limiter 18 by 90° so that the signals detected by the detectors are in phase quadrature. The detected signals on lines 37 and 38 are processed by processor 27 which produces a digital output indicating the phase difference between the antenna outputs and thus the angle of arrival of a received signal. The output of the processor is applied to utilization device 41 which may, by way of example, be an analyzer or a drive-control circuit.

Figure 3:
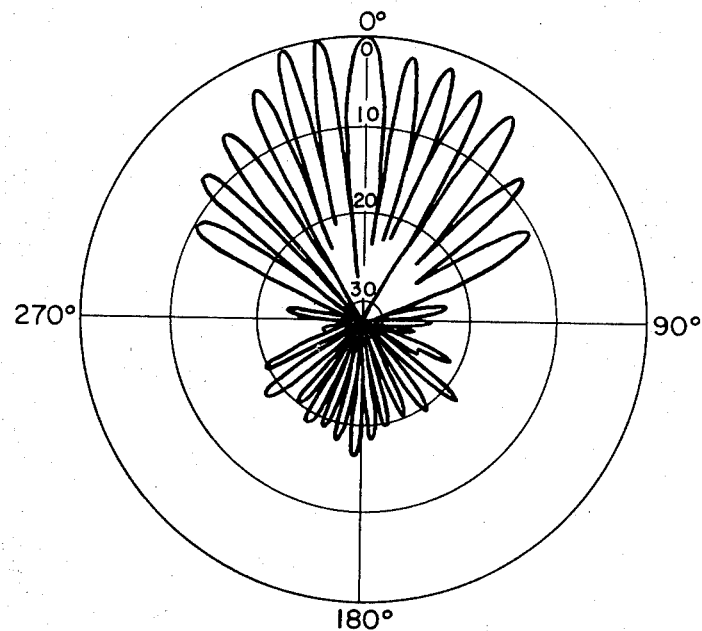

The long baseline phase interferometer comprises antennas 10 and 12, frequency selective networks 14 and 16, limiter circuits 18 and 20, phase shifter 21, phase detectors 25 and 26 and signal processor 39. The long baseline and short baseline interferometers are similar in structure and operation except that the antennas 10 and 12 of the long baseline interferometer are spaced apart a distance $d_2$ that is a number of wavelengths long, for example six, at the center operating frequency of the system. The azimuth antenna patterns of the array of antennas 10 and 12 is illustrated in FIG. 3.

Consider that the signal 40 having an associated wavefront W—W is incident on antenna 10 and time $t_0$. As illustrated in FIG. 1, the wavefront experiences phase delays of $\phi_1$ and $\phi_2$ before it is incident on antennas 11 and 12, respectively. Thus there is a phase difference $\phi_1$ between the outputs of antennas 10 and 11. Similarly, there is a phase difference $\phi_2$ between the outputs of antennas 10 and 12. These phase differences are related to the angle of arrival $\theta$ of signal 40 by the expressions $$\phi_1 = \frac{2\pi d_1}{\lambda} \sin \theta \qquad (1)$$

and $$\phi_2 = \frac{2\pi d_2}{\lambda} \sin \theta \qquad (2)$$

where $\pi$ is a constant and $\lambda$ is the wavelength at the center operating frequency of the system.

The outputs of antennas 10 and 11, for example, are converted to IF signals by networks 14 and 15 if the frequency of signal 40 is within the passband of the networks, Since the system is sensitive only to the phase of received signals, the IF signals are converted by limiters 18 and 19 to constant amplitude signals which are applied to detectors 23 and 24. The phase of the output of limiter 18, however, is shifted 90° prior to application to detector 24 (and detector 25). Thus, the phase difference between the signals applied to detector 23 is $\phi_1$ whereas the phase difference between the signals applied to detector 24 is $\phi_1 - 90°$. Stated differently, the outputs of detectors 23 and 24 are 90° out-of-phase so that the signals on lines 37 and 38 are proportional to cosine $\phi_1$ and —sine $\phi_1$, respectively. (Similarly, the outputs of detectors 25 and 26 are proportional to —sine $\phi_2$ and cosine $\phi_2$, respectively.)

Control circuit 36 is responsive to the outputs of the frequency selective networks for determining whether a received signal is to be processed to determine its direction of arrival. When it is determined that the received signal is to be analyzed, control signals on lines 46 and 46' cause the processors to sample the outputs of the associated detectors. The processors 27 and 39 produce digital outputs that are indications of the phase differences $\phi_1$ and $\phi_2$, respectively, and the angle of arrival $\theta$. The output of processor 27 is a coarse and unambiguous indication of the angle of arrival. The output of processor 39, however, is a more precise but ambiguous indication of the angle of arrival. The outputs of these processors are therefore both required to precisely and unambiguously indicate the angle of arrival. Utilization device 41 includes circuitry for producing such an indication of the angle of arrival. After a predetermined time during which the received signal is analyzed, control signals on lines 47 and 47' cause the processors to reset and thus to be ready for analysis of another received signal.

The curves of FIG. 4 illustrate the operation of a dual channel phase interferometer. Curve 43 is a plot of the phase difference $\phi_1$ (the output of processor 27) as a function of the angle of arrival $\theta$ of received signals over which the system operates. The system represented by FIGS. 2, 3 and 4 operates over an angle of arrival of approximately ±32°. Similarly, curve 44 is a plot of the phase difference $\phi_2$ (the output of processor 39) as a function of all possible angles of arrival $\theta$ of received signals. Curves 43 and 44 therefore illustrate the basis of operation of the short baseline and the long baseline interferometers, respectively. For a particular phase difference $\phi_1$, curve 43 (the output of processor 27) provides a course and unambiguous indication of the angle of arrival of the received signal. Reference to curve 44 reveals that the long banseline interferometer (processor 39) gives a more precise indication of the direction of arrival of the incident signal since the phase slope of the slanted repetitive portions of curve 44 is greater than that of curve 43. The angle of arrival indicated by curve 44 (and processor 39) is ambiguous, however, since the phase difference between the outputs of antennas 10 and 12 varies over ±180° in each lobe (see FIG. 3). When the indications of curves 43 and 44 (i.e., the outputs of processor 27 and 39, respectively) are combined, however, they precisely and unambiguously define the angle of arrival of the received signal. Specifically, the output of processor 27 and the short baseline interferometer is a course indication $\theta_{c(40)}$ corresponding to the intersection of curve 43 and line 45 (the phase difference $\phi_1 = \phi_{40}$) which indicates that the angle of arrival of signal 40 is between the anges $\theta = +4°$ and $\theta = +12°$ 30'. The output of processor 39 and the long baseline interferometer is a fine and ambiguous indication $\theta_{p(40)}$ corresponding to the intersection of curve 44 and line 45 (the phase difference $\phi_2=\phi_{40}$), however, which precisely indicates that the angle of arrival of the signal 40 is 8°37′. Stated differently, the output of processor 27 is related to the coarse indication $\theta_c$ that identifies the particular one of the many possible precise indications $\theta_p$ of the angle of arrival in the output of processor 39. These two outputs of processors 27 and 39 are combined, for example in utilization device 41, to obtain an output which precisely and unambiguously indicates the angle of arrival of an input signal.

The sinusoidal transfer functions of the signals applied to each of the signal processors are graphically illustrated in FIG. 5. Curves 48 and 49 represent the transfer functions of the outputs of detectors 23 and 24, for example, and are functions of cosine $\phi$ and $-\text{sine } \phi$, respectfully. These transfer functions are useful in explaining the operation of both of the processors.

The structure and operation of processors 27 and 39 are the same. The following description specifically states the operation of processor 27 for producinf an output which is proportional to the coarse indication $\theta_c$. Signal processor 39 operates in the same manner for producing an output which is proportional to the precise indication $\theta_p$ of the angle of arrival of an input signal.

Curve 48 is a plot of the magnitude of the output of detector 23 for all possible unique values (over $\pm 180°$) of the phase difference $\phi_1$. Curve 49 is a similar plot of the magnitude of the output of detector 24. The curves are obtained when the orientation of a signal source illuminating the antennas is varied in the azimuth plane over all possible directions of arrival with respect to the antenna baseline, and thus over all possible phase differences between the outputs of the antennas. Since the phase difference $\phi_1$ is a function of the angle of arrival $\theta$ of the received signal as defined by Equation 1, curves 48 and 49 are also functions of the angle of arrival $\theta$ of a received signal. The phase differences $-180°$, $0°$ and $+180°$ correspond to angles of arrival of $+32°$, $0°$ and $-32°$, respectively, associated with curve 43 in FIG. 4. There is a representation similar to FIG. 5 for each slanted-repetitive portion of curve 44.

By way of example, the outputs of detectors 23 and 24 are indicated py curves 48 and 49 to be the voltages $V_{c1}$ and $V_{s1}$, respectively, for the received signal 40 represented by line 40′ in FIG. 5. The voltages $V_{c1}$ and $V_{s1}$ uniquely define a phase difference $\phi_1=\phi_{40}$ associated with signal 40.

Figure 10:
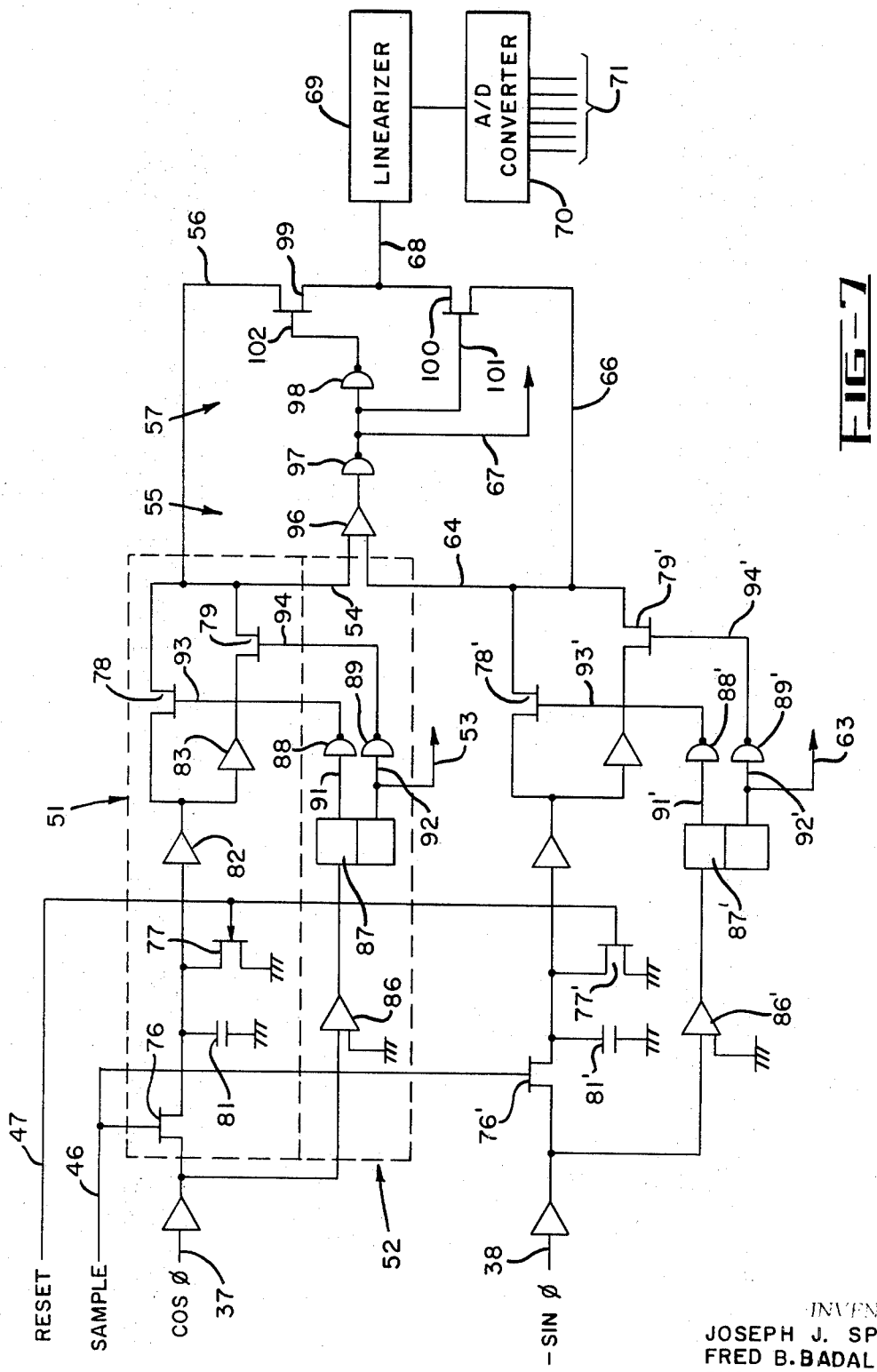
FIG. 10 is a diagrammatical representation of the operation of the processor of FIG. 6; and, FIG. 11 is a table of digital words illustrating the operation of the processor of FIG. 6.

The philosophy of the operation of the processors is graphically illustrated in FIG. 10. The function of the processors is to provide a digital output defining the phase difference and angle of arrival of a received signal such as signal 40. The variation of curves 48 and 49 over a phase difference of $\pm 180°$ is divided into four quadrants $\pm Q_1$ and $\pm Q_2$ (FIG. 10, row 1) and into eight half-quadrants $\pm A$, $\pm B$, $\pm C$, and $\pm D$ i.e., $\pm 0°$ to $\pm 45°$, $\pm 45°$ to $\pm 90°$, $\pm 90°$ to $\pm 135°$, and $\pm 135°$ to $\pm 180°$, respectively, (FIG. 10 row 2). The polarities of curves 48 and 49 in each half-quadrant are indicated in rows 3 and 4, respectively. The curve having the smaller absolute value in each half-quadrant is indicated row 5, wherein $a-$ means that $|\cos \phi|<|-\sin \phi|$. The indications in each column of FIG. 10, rows 3, 4 and 5 make up a 3-bit word uniquely defining a different half-quadrant. Since each pair of vertically aligned points on curves 48 and 49 defines the phase difference associated with a received signal, the 3-bit words define the half-quadrant containing that associated phase difference. By way of example, the 3-bit word 111 (FIG. 10, column 4, rows 3, 4 and 5, respectively, wherein $+=1$ and $-=0$) indicates that the phase difference $\phi_{40}$ caused by signal 40 is in the first negative half-quadrant $-A$. The phase difference $\phi_{40}$ is therefore less than 0° and greater than $-45°$. It is now necessary to determine the phase angle in the half-quadrant $-A$ that defines the phase difference associated with received signal 40.

Reference to FIG. 5 reveals that in each half-quadrant, the magnitude of the curve having the smaller absolute value is approximately a linear function of the absolute magnitude of the phase difference in that half-quadrant (45°) although the sign of the slope of these curves varies between half-quadrants. A voltage between 0 and $\pm V_m$ corresponding to a phase angle $\beta$ is therefore an indication of the absolute magnitude of the phase difference in an associated half-quadrant. More particularly, the phase angle $\beta$, or its complimentary angle $\beta_c=45°-\beta$, is added to the absolute value of the smaller angular limit (FIG. 10, row 6) of the half-quadrant containing the phase difference $\phi_1$ to provide an indication (FIG. 10, row 8) of that phase difference. Since curve 49 has the smaller absolute magnitude in the half-quadrant $-A$, the voltage $V_{s1}$ and the phase angle $\beta_{40}$ associated with signal 40 indicate the number of degrees that the phase difference $\phi_{40}$ is less than 0° and greater than $-45°$. More particularly, since the sign of the phase difference $\phi_1$ and the sign of the slope of the absolute magnitude of curve 49 (the curve having the smaller absolute magnitude) in the half-quadrant $-A$ are the same (i.e., both signs are negative), the phase angle $\beta_{40}$ is equal to the number of degrees that the phase difference $\phi_{40}$ is less than 0°. The absolute magnitude of the phase difference $\phi_{40}$ is therefore $0°+\beta_{40}$ (FIG. 10, column 4, row 8). (Alternatively, the absolute value of the phase difference $\phi_{40}$ is the absolute value of the larger angular limit of the half-quadrant containing the phase angle $\beta_{40}$, minus the complement of the phase angle $\beta_{40}$, i.e., $$\phi_{40}=45°-\beta_{c40}=45°-(45°-\beta_{40})$$

In order to more fully understand the philosophy of operation of the processors and the complementation operation, consider the signal 50 represented by line 50′ in FIG. 5. The 3-bit word 110 (FIG. 10, column 3, rows 3, 4 and 5) indicates that the phase difference $\phi_{50}$ is in the half-quadrant $-B$ and is therefore less than $-45°$ (FIG. 10, column 3, row 6) and greater than $-90°$. Since curve 48 has the smaller absolute value in the half-quadrant $-B$, the voltage $V_{c2}$ and the phase angle $\beta_{50}$ indicates the number of degrees that the phase difference $\phi_{50}$ is less than $-45°$ and greater than $-90°$. More particularly, since the sign of the phase difference $\phi_{50}$ and the slope of the absolute magnitude of curve 48 (the curve having the smaller absolute magnitude) in the half-quadrant $-B$ have opposite signs (i.e., $-$ and $+$, respectively), the phase angle $\beta_{50}$ is equal to the number of degrees that the phase difference $\phi_{50}$ is greater than $-90°$. The absolute value of the phase difference $\phi_{50}$ is therefore 45° plus the complement of the phase angle $\beta_{50}$, i.e., $$|\phi_{50}|=45°+|\beta_{c50}|=45°+(45°-|\beta_{50}|)$$

(FIG. 10, column 3, row 8). (Alternatively, the phase difference $|\phi_{50}|=|-90°|-|\beta_{50}|$.) Row 7 provides a binary indication of $+$ or $-$ indicating whether the phase angle $\beta$ or its complement $\beta_c$, respectively, is to be added to the magnitude of the smaller valued angular limit of a particular half-quadrant to indicate the absolute value of the phase difference $\phi_1$.

In order to provide a digital indication of the phase difference $\phi_1$, the analog voltage corresponding to the phase angle $\beta$ or its complement $\beta_c$ is converted to a 6-bit word before it is combined with the 3-bit word defining a half-quadrant to produce a digital indication of the phase difference. The 3-bit words defining half-quadrants and the 6-bit words defining the phase angle $\beta$ in associated half-quadrants are tabulated in FIG. 11, columns 3 and 4, respectively.

Figure 6:
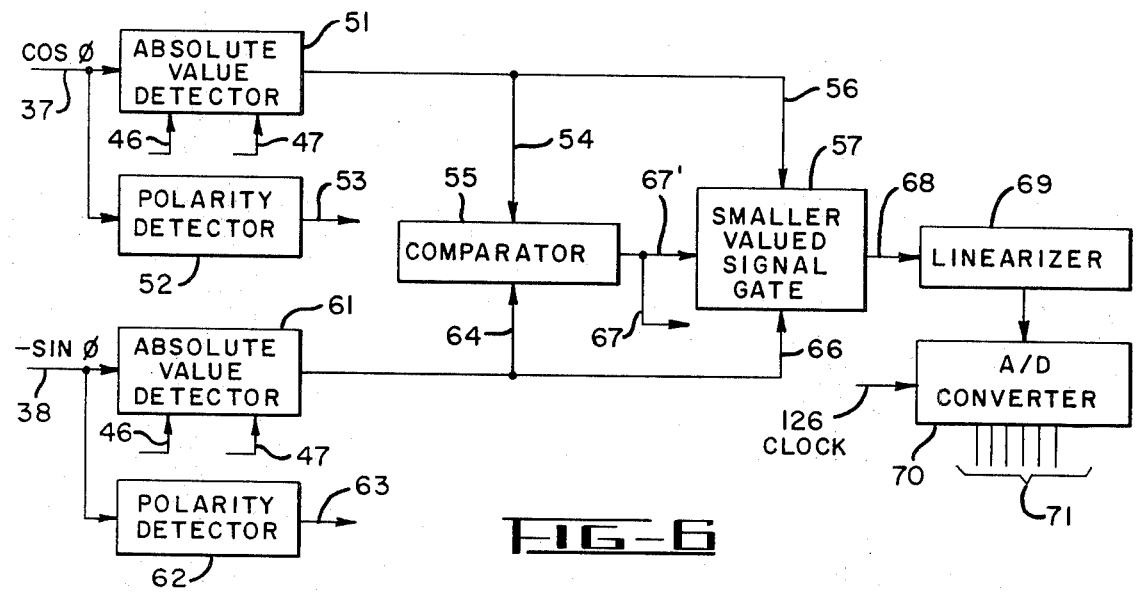
FIG. 6 is a schematic block diagram of a part of a signal processor of the system of FIG. 1.
Figure 8:
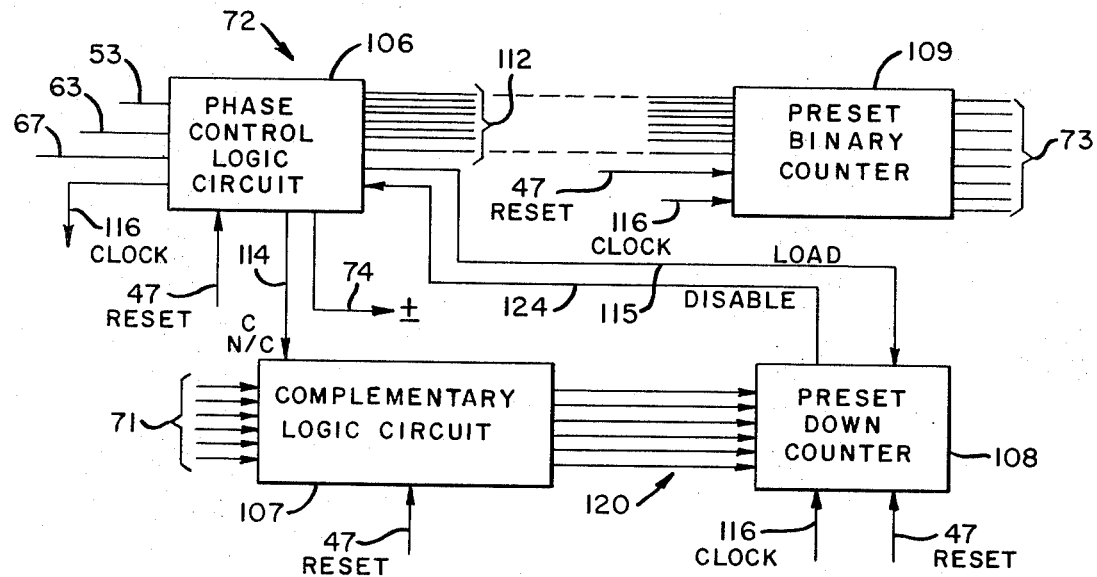
FIG. 8 is a block diagram of other parts of a signal processor of the system of FIG. 1.

The structure comprising each of the signal processors 27 and 39 is illustrated in FIGS. 6, 7 and 8. Since both processors comprise the same structure and operate in the same manner, the structure and operation thereof will be discussed in relation to processor 27. Referring now to FIG. 6, processor 27 comprises absolute value detector 51 and polarity detector 52 which are each responsive to the output of phase detector 23 (curve 48, FIG. 5). The output of polarity detector 52 on line 53 is the binary indication of the polarity of curve 48 (FIG. 10, row 3), i.e., that the voltage on line 37 is positive or negative or is for example, greater than or less than a prescribed reference voltage $V_0=0$ volts. The output of detector 51 is applied on line 54 to comparator 55 and on line 56 to gate 57. Similarly, absolute value detector 61 and polarity detector 62 are each responsive to the output of phase detector 24 (FIG. 5, curve 49). The output of detector 62 on line 63 is the binary indication of the polarity of curve 49 (FIG. 10, row 4). The output of detector 61 is applied on lines 64 and 66 to comparator 55 and gate 57, respectively.

The output of comparator 55 on line 67 is the binary indication of whether the output of detector 51 or detector 61 has the small absolute value (FIG. 10, row 5). Gate 57 is responsive to the comparator output on line 67' for connecting to line 68 the output of detector 51 or 61 having the smaller absolute value.

The output of gate 57 is applied to linearizer 69 which adjusts the smaller valued detector output to be a linear function of phase angle in the associated half-quadrant. The output of the linearizer is applied to analog-to-digital converter 70 which produces on line 71 to 6-bit word (FIG. 11, column 4) indicating the phase angle $\beta$ corresponding to the smaller valued detector output connected thereto. By way of example, the words in FIG. 11, column 3, rows 1–10, indicate the absolute value of the angle $\beta$ in the half-quadrant $\pm A$ in 1° increments between 0 and 45°, respectively. The words in FIG. 11, column 4, rows 11–16 indicate the absolute value of the angle $\beta$ in the half-quadrants $\pm B$ in 1° increments between 44° and 0°, respectively.

Figure 11:
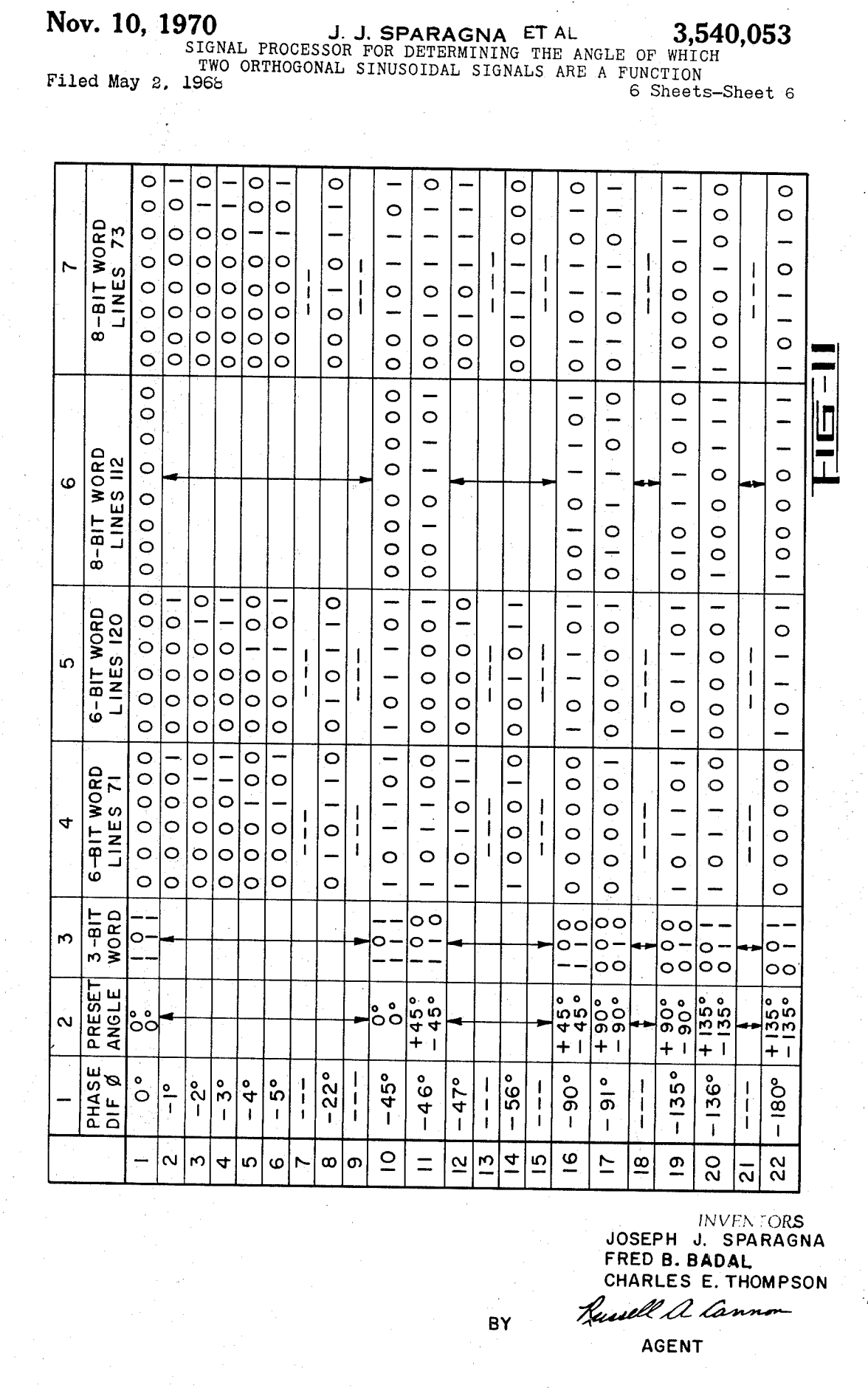

The outputs of converter 70, comparator 55 and detectors 52 and 62 are logically combined by digital phase angle computer 72 (see FIG. 8) which produces on lines 73 an 8-bit word indicating the phase difference $\phi$ between the antenna outputs in one degree increments over 180° (FIG. 11, column 7). The signal on line 74 indicates whether the phase difference $\phi_1$ is positive or negative, i.e., to the right or left of the bore sight direction X—X as viewed in FIG. 1.

Referring to FIG. 7, processor 27 will now be described in greater detail. Since detectors 51 and 52 and detectors 61 and 62, respectively, are similar in operation and structure, only the structure and operation of detectors 51 and 52 will be described in detail. Like elements in corresponding detectors are designated by primed reference characters.

Detector 51 comprises field effect transistor switches 76–79, inclusive, capacitor 81, non-inverting buffer amplifier 82 and inverting amplifier 83. The output of detector 23 on line 37 is connected through switch 76 to capacitor 81 and amplifier 82. The sample output of control circuit 36 on line 46 controls the operation of switch 76 and thus storage of the signal on line 37 by the capacitor. Operation of switch 77, and thus discharge of capacitor 81, is controlled by the reset signal on line 47 from the control circuit. Buffer amplifier 82 has a high input impedance with respect to ground for preventing leakage of charge from capacitor 81 during storage of an input signal. Amplifier 83 has unity gain and is responsive to a negative input signal for inverting the polarity thereof. Amplifier 83 is unresponsive to input signals having a positive value. Switches 78 and 79 are both connected to line 54 and the first input of comparator 55. Similarly, switches 78' and 79' are both connected to the second input to the comparator.

Polarity detector 52 comprises a non-inverting amplifier or voltage comparator 86, bistable multivibrator 87 and NAND gates 88 and 89. Comparator 86 provides a binary indication e.g., a positive or negative voltage of the polarity of the input signal from phase detector 23.

Multivibrator 87 is biased by a positive input voltage to produce on lines 91 and 92 first and second outputs which are negative and positive voltages, respectively. Conversely, the first and second outputs of the multivibrator are positive and negative voltages, respectively, if the input bias voltage is negative. Thus, the output of the multivibrator is an indictaion of the polarity of the input signal. Gate 88 is responsive to the negative voltage on line 91 for producing a positive output on line 93 that forward biases and closes switch 78. Similarly, gate 89 is responsive to the negative voltage on line 92 for producing a positive output on line 94 that forward biases and closes switch 79. Thus, the signal stored by capacitor 81 is coupled to the comparator through switch 78 when the input signal is positive and through switch 79 when the input signal is negative.

Compartaor 55 comprises a non-inverting high gain saturating voltage amplifier 96 and NAND gate 97. Amplifier 96 may, by way of example, be a $\mu A710$ high-speed differential comparator manufactured by Fairchild Semiconductor. Gate 97 may, by way of example, produce a positive $(+)$ output voltage when the voltage on line 54 is greater than the voltage on line 64 (i.e., when $|\text{cosine } \phi|$ is greater than $|-\text{sine } \phi|$). (FIG. 10, row 5).

The smaller valued signal gate circuit 57 comprises NAND gate 98 and field effect transistor switches 99 and 100. The output of gate 97 on line 101 controls the operation of switch 100. The output of gate 98 on line 102 controls the operation of switch 99. The output of circuit 57 is coupled through linearizer 69 to the converter 70. The output of the converter on lines 71 is the 6-bit word defining the phase angle $\beta$ in a particular half-quadrant (FIG. 11, column 4).

As shown in FIG. 8, digital phase angle computer 72 correlates the outputs of detectors 52 and 62, comparator 55 and converter 70 to produce a unique digital indication of the phase difference between signals received by the antennas. Computer 72 comprises phase control logic circuit 106, complementary logic circuit 107, preset down counter 108, and preset binary counter 109. The design of devices such as A/D converter 70, logic circuits 106 and 107 and counters 108 and 109 is generally described in Logic Design of Digital Computers by M. Phister, Jr., John Wiley & Sons, Inc., 1961.

Complementary logic circuit 107 may, by way of example, comprise a storage register which stores the 6-bit digital word (FIG. 11, column 4) from A/D converter 70.

The phase control logic circuit 106 is responsive to the outputs of polarity detectors 52 and 62 on lines 53 and 63, respectively, and comparator 55 on line 67 for producing an 8-bit word on lines 112 indicating the absolute value of the smaller valued phase limit of the half-quadrant containing the phase difference (FIG. 11, column 6). By way of example, the 3-bit word 111 (FIG. 10, column 4, rows 3, 4 and 5, and FIG. 11, column 3, row 1) on lines 53, 63 and 67 defining a phase difference in the first negative half-quadrant —A biases logic circuit 106 to produce on lines 112 the 8-bit word 00000000 (FIG. 11, column 6, row 1) representing a phase angle of 0°. Similarly, the 3-bit word 110 (FIG. 10, column 3, rows 3, 4 and 5 and FIG. 11, column 3, row 11) defining a phase difference in the second negative quadrant —B biases circuit 106 to produce on lines 112 the 8-bit word 00101101 (FIG. 11, column 6, row 11) representative of a phase angle of 45°. Counter 109 is preset by the 8-bit word on lines 112 to the smaller valued phase limit of the half-quadrant containing the phase difference (FIG. 11, column 6).

Logic circuit 106 is also responsive to the 3-bit word for producing an output on line 74 indicating whether the source of received signals is to the right or left of bore sight axis X'—X' as viewed in FIG. 1 and an output on line 114 indicating whether the 6-bit word (FIG. 11, column 4) stored by logic circuit 107 must be complemented (FIG. 10, rows 7 and 8, half-quadrants ±B and ±D). The complementary logic is responsive to the control signal on line 114 for complementing the output of the A/D converter (FIG. 11, column 5, rows 11–16, and 20–22, for example).

A predetermined time after producing the control signal on line 114, logic circuit 106 produces a control signal on line 115 that enables counter 108 to be preset with the 6-bit word stored by the complementary logic (FIG. 11, column 5). The predetermined time delay between generation of control signals on line 114 and 115 allows logic circuit 107 sufficient time to complement the output of converter 70 before preset of the down counter. The 6-bit words with which counter 108 is preset are tabulated in FIG. 11, column 5. A predetermined time after generation of the control signal on line 115 that is sufficient to allow for preset of counter 108, clock pulses from the control logic are applied on lines 116 to synchronize the counting of counters 108 and 109. Counter 108 subtracts a count from the contents thereof in response to each clock pulse. Conversely, counter 109 adds a count to the contents thereof in response to each clock pulse. After down counting to zero, counter 108 produces a control signal on line 124 that biases control logic 106, to disconnect the clock pulses from lines 116 and thus to disable the counters. In this manner, the count stored in counter 108 (FIG. 11, column 5) is effectively added to the 8-bit word (FIG. 11, column 6) in counter 109 to produce on lines 73 an 8-bit word (FIG. 11, column 7) indicating the absolute value of the phase difference $\phi_1$ in 1° increments. The system is reset by a signal from control circuit 36 that is applied on lines 47 to switch 77, logic circuits 106 and 107, and counters 108 and 109. The previous description also describes the operation of signal processor 39 which operates in the same manner for indicating the phase difference $\phi_2$.

The overall operation of the system in response to the received signal 40 will now be summarized. Since the direction of propagation of signal 40 makes an angle $\theta$ with respect to the bore sight axis X'—X', the wavefront W—W experiences phase delays of $\phi_1$ and $\phi_2$ between receipt by antennas 10 and 11 and antennas 10 and 12, respectively. Considering the operation of the short baseline interferometer to yield a coarse indication of the angle of arrival (the long baseline system operates in a similar manner to provide a precise indication of the angle of arrival), the outputs of antennas 10 and 11 are converted to constant amplitude IF signals that are each applied to phase detectors 23 and 24. Referring now to FIG. 5, the intersection of signal line 40' and curves 48 and 49 indicates that the outputs of detectors 23 and 24 are the voltages $+V_{c1}$ and $+V_{s1}$, respectively.

Upon analysis of the IF signals from the frequency selective networks and the determination that received signal 40 be analyzed, control circuit 36 produces a pulse on lines 46 that enables circuit 27 to process the detected signals. Specifically, the control signal closes switches 76 and 76' causing capacitors 81 and 81' to store the voltages $V_{c1}$ and $V_{s1}$, respectively. Comparators 86 and 86' are biased by the positive output voltages that control the operation of multivibrators 87 and 87', respectively. The multivibrators are biased by the outputs of the comparators, and thus are responsive to the detector outputs, for each producing a first output that is a negative voltage, and a second output that is a positive voltage. The outputs on lines 53 and 63 are therefore both positive indicating that the polarities of the outputs of detectors 23 and 24, i.e., the voltages $V_{c1}$ and $V_{s1}$, are both positive (FIG. 10, column 4, rows 3 and 4, respectively). Gates 88 and 88' therefore cause switches 78 and 78' to close to couple the positive voltages stored by the capacitors to comparator 55.

Amplifier 96 compares the absolute value of the voltage stored on capacitors 81 and 81' and provides a binary indication thereof. The amplifier output may, for example, be a logic level "1" (a high voltage) when the voltage on line 64 is less than the voltage on line 54. Gate 97 therefore produces a positive voltage on line 67 indicating that the voltage $V_{s1}$ from detector 24 is less than the voltage $V_{c1}$ from detector 23 (FIG. 10, column 4, row 5). The signal on line 101 closes switch 100 and connects the smaller valued voltage $V_{s1}$ from detector 24 to converter 70. The A/D converter produces the 6-bit word 010110 (FIG. 11, column 4, row 8) that is stored in complementary logic 107 and indicates the phase angle $\beta_{40}$ of the phase difference $\phi_{40}$ in the half-quadrant —A.

The signals on lines 53, 63 and 67 comprise the 3-bit word 111 (FIG. 11, column 3, rows 1–10) that indicates the absolute magnitude of the smaller phase limit of the half-quadrant —A. Logic circuit 106 is responsive to 3-bit word 111 for producing the corresponding 8-bit word in FIG. 11, column 6, rows 1–10 that is preset in counter 109 and represents the preset angle 0°. The control logic circuit is also responsive to the 3-bit word 111 for producing a negative voltage on line 74 indicating that the phase differences $\phi_{40}$ is negative and for producing a positive voltage (FIG. 10, column 4, row 7) indicating that complementation of the 6-bit word (FIG. 11, column 4, row 8) stored by logic circuit 107 is not required. After preset of the counter 108 by the signal stored in the complementary logic (FIG. 11, column 5, row 8), clock pulses on lines 116 cause the counter 109 to register the down count of counter 108 to produce the 8-bit word (FIG. 11, column 7, row 8) on lines 73 indicating that the phase difference $\phi_{40}=22°$. Similarly, processor 39 produces on 8-bit word on lines 73' indicating the phase difference $\phi_2$ associated with the signal 40. The 8-bit words on lines 73 and 73' together unambiguously define the angle of arrival $\theta$ of the received signal 40.

The operation of the short baseline system and processor 27 in response to the signal 50 (line 50' in FIG. 5) is represented in FIG. 10, column 3, and FIG. 11, row 14. The signals on lines 53 and 63 (FIG. 10, column 3, rows 3 and 4) indicate that the voltages $V_{c2}$ and $V_{s2}$ from detectors 23 and 24, respectively, are both positive as in the previous example. The signal on line 67 (FIG. 10, column 3, row 5), however, indicates that the output of detector 23 has the smaller absolute value. The voltage $V_{c2}$ from detector 23 is therefore connected to converter 70 which produces the 6-bit word 100010 (FIG. 11, column 4, row 14) representing the phase angle $\beta_{50}$ and stored by circuit 107. The 3-bit word 110 (FIG. 10, column 3, rows 3, 4 and 5 and FIG. 11, column 3, row 14) indicates that the phase difference $\phi_{50}$ is in the half-quadrant —B and biases control logic 106 to preset counter 109 with the 8-bit word 00101101 (FIG. 11, column 6, row 14) representing the smaller valued phase limit 45° of the half-quadrant —B. The 3-bit word 110 also indicates that it is necessary to complement (FIG. 10, column 3, row 7) the 6-bit word stored by logic circuit 107. The complemented signal that is preset in down counter 108 is indicated in FIG. 11, column 5, row 14. Counter 109 records the down count of counter 108 to produce the 8-bit word (FIG. 11, column 7, row 14) indicating that the phase difference $\phi_{50}=56°$. This word is a coarse indication of the angle of arrival of the input signal. Simultaneous operation of the long baseline system provides a second 8-bit word which precisely and ambiguously indicates the angle of arrival. These two 8-bit words, which together uniquely and unambiguously define the angle of arrival of the input signal, are applied to the utilization device 41.

Figure 9:
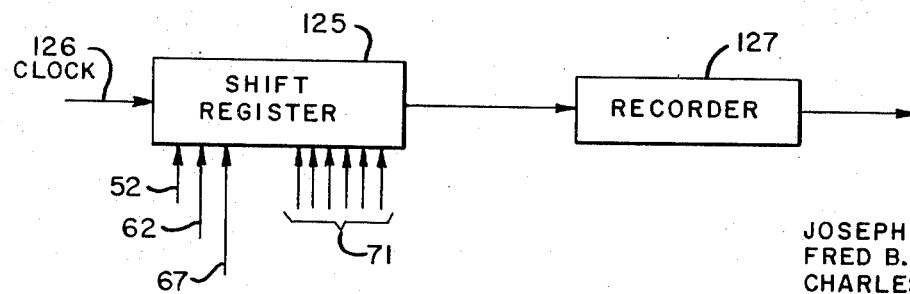
FIG. 9 is a block diagram of a system for recording the outputs of the signal processors.

In manpack and airborne reconnaissance systems it may be more important that the system have minimum weight than that it provide an instantaneous bearing reading of a received signal. In such a system the information defining the received signal and illustrated in FIG. 10 is produced and recorded in the field. This information is then brought to a fixed central facility for further processing to produce a digital indication of the bearing of the received signal. When the system described herein is deployed in such an application only the circuitry comprising each signal processor that is illustrated in FIG. 8 and the utilization device 41 are located at the central facility. In the field, the outputs of detectors 52 and 62, comparator 55 and converter 70 of each processor are applied to an associated shift register 125, see FIG. 9. Each shift register is responsive to clock signals on line 126 from control circuit 36 for advancing the contents of the register into the associated recorder 127. The information stored on tape, for example, is applied at the central facility to the components illustrated in FIG. 8 for producing a more convenient digital indication of the angle of arrival of a received signal. The information stored on each tape is a 9-bit word in which the first 6 places comprise the 6-bit word in column 4, FIG. 11, and the last 3 places comprise the 3-bit word in column 3, FIG. 11, for example.

Changes, modifications and improvements may be made in the above described preferred embodiment of the invention by those skilled in the art without departing from the scope thereof. By way of example, a digital linearizer may be employed between converter 70 and logic circuit 107 in place of the analog linearizer 69. Also, counter 109 may be a binary coded decimal counter for driving a plurality of alphanumeric display tubes presenting a visual indication of the direction of arrival of a received signal. The output of counter 109 would then be a 9-bit word and a new FIG. 11 would be required to describe the operation of the system. The novel features of this invention are described in the appended claims.

We claim:

1. A dual channel phase interferometer direction finding system comprising first, second and third antennas spaced apart and oriented for receiving an incident signal, the output signals of said antennas for an incident signal that is off axis with respect to the antenna boresight axes differing in phase by angles that are related to the direction of arrival of the incident signal, a control circuit responsive to the antenna output signals for producing first and second control signals, a limiter circuit responsive to the antenna output signals for producing first, second and third constant amplitude output signals each having a phase related to the phase of the first, second and third antenna output signals, respectively, a phase shifter responsive to the first constant amplitude signal for delaying the phase thereof 90°, first and second phase detectors each having a first input terminal receiving the output of said phase shifter, and each having a second input terminal and an output terminal, said second input terminal of said first phase detector receiving the second constant amplitude signal, said second input terminal of said second phase detector receiving the third constant amplitude signal, a third phase detector having first and second input terminals receiving the first and second constant amplitude signals, respectively, and having an output terminal, a fourth phase detector having first and second input terminals receiving the first and third constant amplitude signals, respectively, and having an output terminal, the output signals of each of said pairs of said first and third phase detectors and said second and fourth phase detectors being a pair of orthogonal sinusoidal signals each proportional to the phase difference between the first and second antenna output signals, and the first and third antenna output signals, respectively, said orthogonal signals each producing a sinusoidal transfer function having a magnitude that varies about a reference level and having a phase difference that various over ±180° when the direction of arrival of the incident signal is varied over all possible unique values in the same plane, first means processing the output signals of said first and third phase detectors for producing an electrical output signal indicating the phase difference between the first and second antenna output signals and thus the angle of arrival of the incident signal, second means processing the output signals of said second and fourth phase detectors for producing an electrical output signal indicating the phase difference between the first and third antenna output signals and thus the angle of arrival of the incident signal, and utilization means receiving the outputs of said first and second processing means, said first processing means comprising:

a first polarity detector responsive to the output signal of said first phase detector for producing a first binary output indicating whether the magnitue thereof with respect to the reference level is positive, a second polarity detector responsive to the output signal of said third phase detector for producing a second binary output indicating whether the magnitude thereof with respect to the reference level is positive, binary indicating means responsive to the output signals of said first and third phase detectors for producing first and second output signals proportional to the absolute values of the first and third phase detector outputs, respectively, with respect to the reference level, and a third binary output indicating whether the absolute value of the first phase detector output signal with respect to the reference level is smaller than the absolute value of the third phase detector output signal with respect to the reference level, first digital indicating means responsive to the outputs of said binary indicating means for producing a first digital word indicating the absolute magnitude of one of said first and third phase detector output signals having the smaller absolute value, the binary outputs indicating a half-quadrant containing the phase difference and said first digital word indicating the magnitude of the phase difference in the half-quadrant containing the phase difference between the first and second antenna output signals.

2. The system according to claim 1 wherein said first processing means includes second digital indicating means responsive to said first, second and third binary outputs for producing a second digital word indicating the smaller angular limit of the half-quadrant containing the phase difference between the first and second antenna output signals, means responsive to the first, second and third binary outputs and the first digital word for computing a third digital word that is equal to the first word and is the complement of the first word when the phase difference and the rate of change of the absolute value of the transfer function associated with the smaller valued of the first and third phase detector output signals have the same and opposite signs, respectively, and means combining the second and third digital words for producing the digital indication of the phase difference between the first and second antenna outputs.

3. The system according to claim 2, said binary indicating means comprising:

third and fourth detector circuits receiving the output signals of said first and third phase detectors, respectively, for producing output signals proportional to the absolute values thereof with respect to the reference level, a first comparator circuit responsive to the output signals of said third and fourth detector circuits for producing the third binary output signal, and said first digital indicating means comprising:
- a gate circuit having first and second input terminals receiving the output signals of said third and fourth detector circuits, respectively, having a third input terminal receiving the output signal of said first comparator circuit and having an output terminal,
- an analog-to-digital converter having an input terminal connected to the output terminal of said gate circuit and producing the first digital word,
- said gate circuit being responsive to the output signal of said first comparator circuit for connecting to said converter the output of said third or fourth detector circuits having the smaller absolute value.

4. The system according to claim 3, said first and second polarity detectors each comprising a second voltage comparator circuit responsive to the associated phase detector output signal, and said third and fourth detector circuits each comprising:
- a capacitor having a first terminal connected to a reference voltage ad having a second terminal,
- a first switch circuit having a first terminal receiving the output signal of the associated phase detector, having a second terminal connected to the second terminal of said capacitor, and having a third terminal receiving the first control signal from said control circuit, said first switch circuit being responsive to the first output signal of said control circuit for coupling the output signal of the phase detector to said capacitor,
- a second switch circuit having a first terminal connected to the reference voltage, having a second terminal connected to the second terminal of said capacitor, and having a third terminal receiving the second control signal from said control circuit and being responsive to operation thereof for discharging said capacitor,
- an inverting amplifier having an input terminal connected to the second terminal of said capacitor and having an output terminal,
- a third switch circuit having a first terminal connected to the second terminal of said capacitor, having a second terminal connected to a first input terminal to said first comparator circuit, and having a third terminal,
- a fourth switch circuit having a first terminal connected to the output terminal of said inverting amplifier, having a second terminal connected to the second terminal of said third switch circuit, and having a third terminal, and
- means coupling the output of said second voltage comparator circuit to the third terminals of said third and fourth switch circuits.

5. The system according to claim 4 wherein said combining means comprises:
- a first digital down counter preset to the third digital word from said computing means for down counting to zero, and
- a second digital counter preset to the second digital word and being responsive to the operation of said down counter for combining the second and third digital words for producing a digital indication of the phase difference between the outputs of the first and second antennas.

6. The system according to claim 1 wherein said utilization means comprises:
- a shift register having a plurality of input terminals receiving the binary output signals and the first digital word, and producing an output signal, and
- means for recording the output signal of said shift register.

7. Apparatus responsive to first and second received signals that are orthogonal sinusoidal functions of the same angle for producing a digital indication of the angle, the magnitude of the angle varying between prescribed limits which are greater than 45°, the magnitudes of the signals varying about a prescribed reference level, said apparatus comprising:
- first binary means responsive to the first signal for producing a first binary output indicating whether the magnitude thereof is greater than the reference level,
- second binary means responsive to the second signal for producing a second binary output indicating whether the magnitude thereof is greater than the reference level,
- third binary means responsive to the received signals for producing first and second outputs proportional to the absolute values of the first and second received signals, respectively, with respect to the reference level, and a third binary output indicating whether the absolute value of the first received signal is smaller than the absolute value of the second received signal,
- the digital word defined by the first, second and third binary outputs indicating a half-quadrant containing the angle.

8. Apparatus according to claim 7 including first digital means responsive to the output signals of said third binary means for producing a first digital word indicating the magnitude of the received signal having the smaller absolute value, said first digital word indicating the magnitude of the angle in the half-quadrant containing the angle.

9. Apparatus according to claim 8 including:
- second digital means responsive to the first, second and third binary outputs for producing a second digital word indicating an angular limit of the half-quadrant containing the angle, and
- first means combining said first and second digital words for producing a digital indication of the angle.

10. Apparatus according to claim 8 including:
- third digital means responsive to said first, second and third binary outputs for producing a third digital word indicating the smaller angular limit of the half-quadrant containing the angle,
- means responsive to said first, second and third binary outputs and said first digital word for computing a fourth digital word that is equal to the first word and is the complement of the first word when the angle and the rate of change of the absolute value of the sinusoidal transfer function associated with the signal having the smaller absolute value have the same and opposite signs, respectively, and
- second means combining said third and fourth words for providing a digital indication of the angle.

11. Apparatus according to claim 10 wherein said second combining means comprises:
- a first digital counter responsive to the output of said computing means for producing a count corresponding to the fourth digital word, and
- a second digital counter preset to contain said third digital word and being responsive to the operation of said first counter for combining the third and fourth digital words for producing a digital indication of the angle.

12. Apparatus according to claim 8 wherein said third binary means comprises:
- a first detector circuit responsive to the first received signal for producing an output proportional to the absolute value thereof with respect to the reference level,
- a second detector circuit responsive to the second received signal for producing an output proportional to the absolute value thereof with respect to the reference level, and a first comparator responsive to the outputs of said first and second detector circuits for producing the third binary output indicating whether the absolute value associated with the first signal is larger than the absolute value associated with the second signal.

13. Apparatus according to claim 12 wherein said first digital means comprises:

a gate circuit having first and second input terminals receiving the outputs of said first and second detector circuits, respectively, having a third input terminal receiving the output of said first comparator and having an output terminal, an analog-to-digital converter having an input terminal and producing an output, and first means connecting the output terminal of said gate circuit to the input terminal of said converter, said gate circuit being responsive to the operation of said comparator for connecting the detector circuit output having the smaller absolute value to said converter, said converter being responsive to the smaller valued detector output signal for producing the first digital word indicating the magnitude of the angle in the half-quadrant containing the angle.

14. Apparatus according to claim 13:

said first binary means comprising a second voltage comparator responsive to the first signal for producing a binary indication of whether the magnitude thereof is greater than the reference level, said first detector circuit comprising:

a capacitor having a first terminal receiving the first received signal and having a second terminal connected to a reference voltage, an inverting amplifier having an input terminal connected to the first terminal of said capacitor and having an output terminal, a first switch circuit having a first terminal connected to the first terminal of said capacitor, having a second terminal connected to a first input terminal to said first comparator, and having a third terminal, a second switch circuit having a first terminal connected to the output terminal of said inverting amplifier, having a second terminal connected to the second terminal of said first switch, and having a third terminal, and second means connecting the output of said second voltage comparator to the third terminals of said switch circuits.

15. Apparatus according to claim 14 wherein said first connecting means comprises a linearizer.

16. The method of producing a digital indication of an angle of which first and second orthogonal sinusoidal signals are a function, said angle varying over a range of values greater than 45°, the magnitudes of said signals varying about a reference level, comprising the steps of:

producing a first binary output indicating whether the magnitude of the first signal is greater than the reference level, producing a second binary output indicating whether the magnitude of the second signal is greater than the reference level, producing a third binary output indicating whether the absolute magnitude of the first signal with respect to the reference level is greater than the absolute magnitude of the second signal with respect to the reference level, and producing a first digital word indicating the absolute value of the signal having the smaller absolute magnitude, the binary outputs and said first digital word indicating a half-quadrant containing the angle and the magnitude of the angle in the half-quadrant, respectively.

17. The method according to claim 16 wherein the step of producing said third binary output includes the steps of:

producing a fourth output having a value proportional to the absolute magnitude of the first signal, producing a fifth output having a value proportional to the absolute magnitude of the second signal, and comparing the values of the fourth and fifth outputs.

18. The method according to claim 17 including the step of producing a second digital word indicating an angular limit of the half-quadrant containing the angle and defined by the first, second and third binary outputs, and combining the first and second digital words for producing a digital indication of the angle.

19. The method according to claim 17 including the steps of:

producing a third digital word indicating the smaller valued angular limit of the half-quadrant containing the angle and defined by the first, second and third binary outputs, complementing the first digital word when it is in at least some of the half-quadrants for producing a fourth digital word, combining the first and third digital words for producing a digital indication of the angle when the sign of the angle and the sign of the rate of change of the absolute value of the transfer function of the signal having the smaller absolute value in the half-quadrant containing the angle are the same, and combining the third and fourth digital words for producing a digital indication of the angle when the angle and the rate of change of the absolute value of the transfer function of the signal having the smaller absolute value in the half-quadrant containing the angle have opposite signs.

References Cited

UNITED STATES PATENTS 3,349,394  10/1967  Carver _____ 343—16

RICHARD A. FARLEY, Primary Examiner

U.S. Cl. X.R.

324—83